Sept. 28, 1954     Z. P. CANDEE     2,690,239
FRICTION BRAKE
Filed Jan. 8, 1951     3 Sheets-Sheet 2
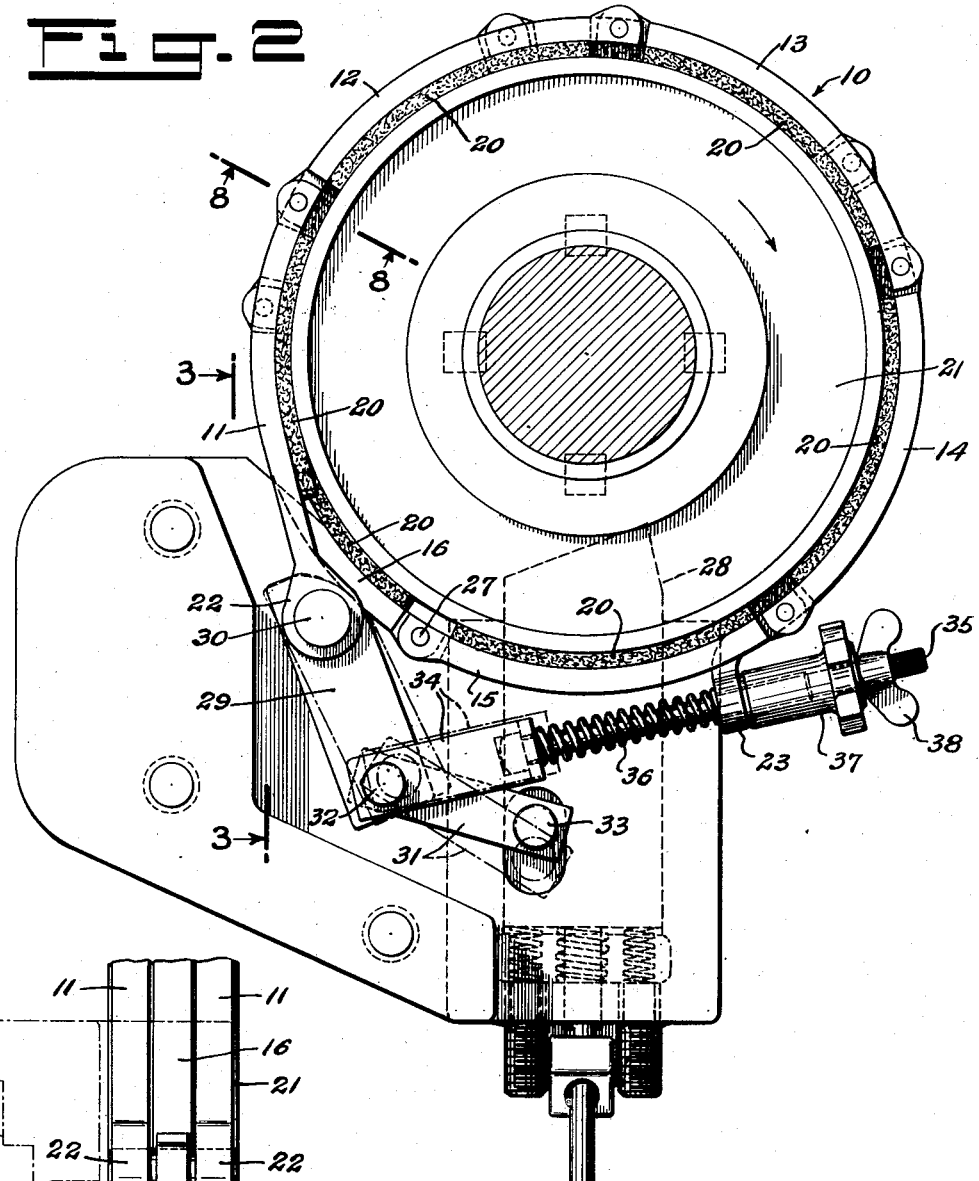
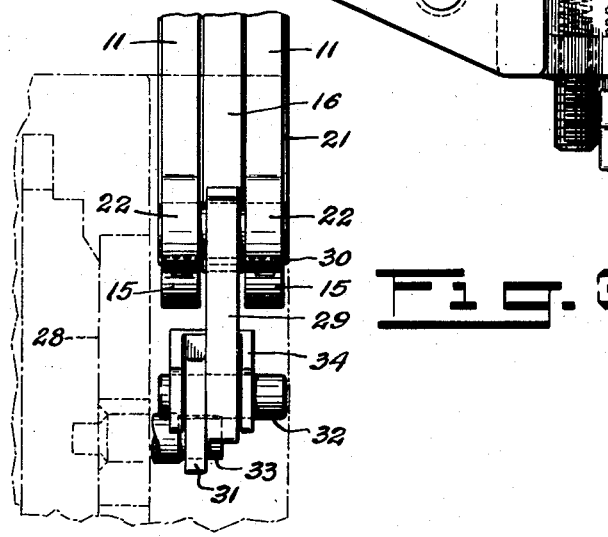
INVENTOR.
ZENAS P. CANDEE
BY
H. G. Manning
ATTORNEY

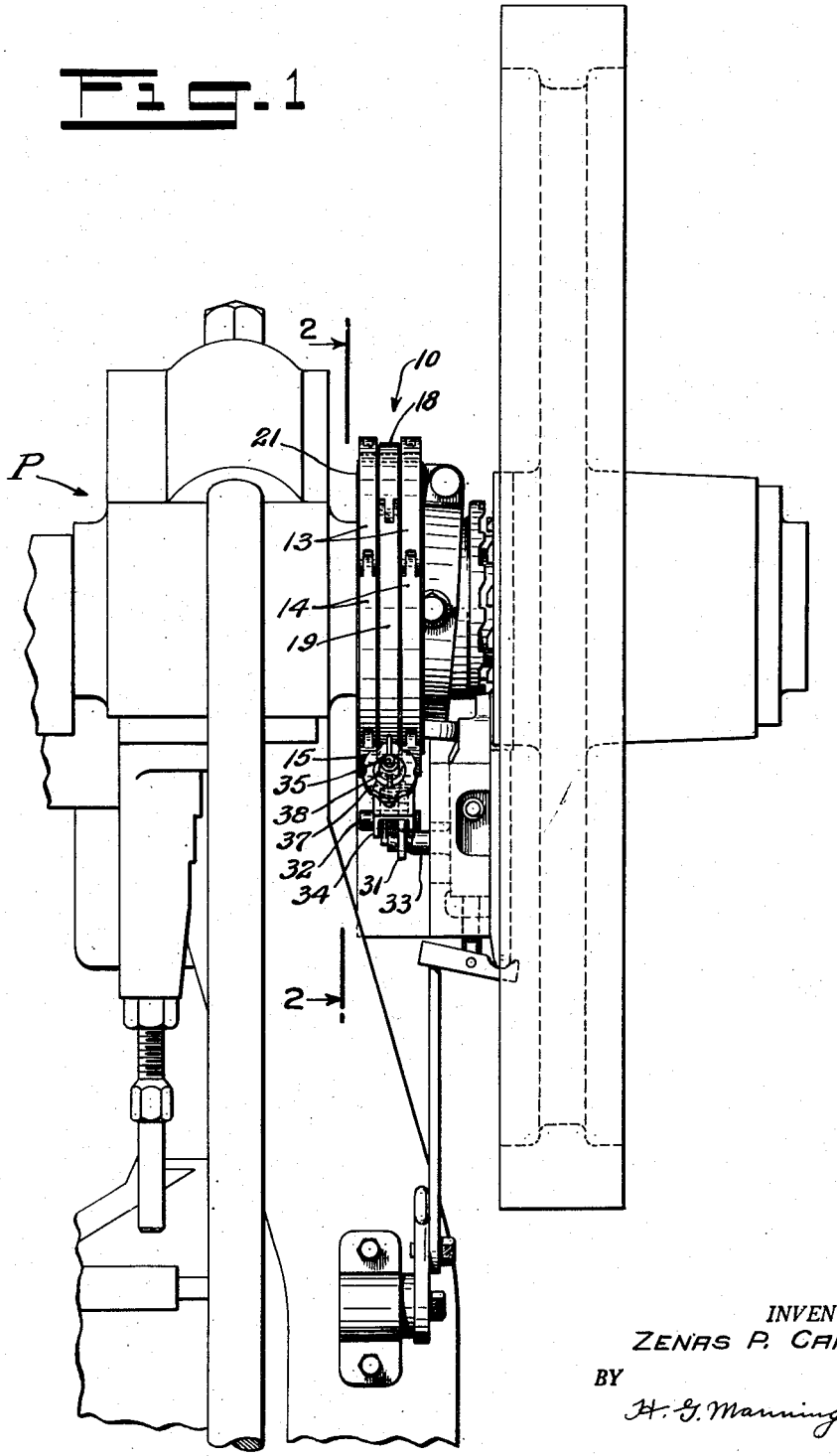

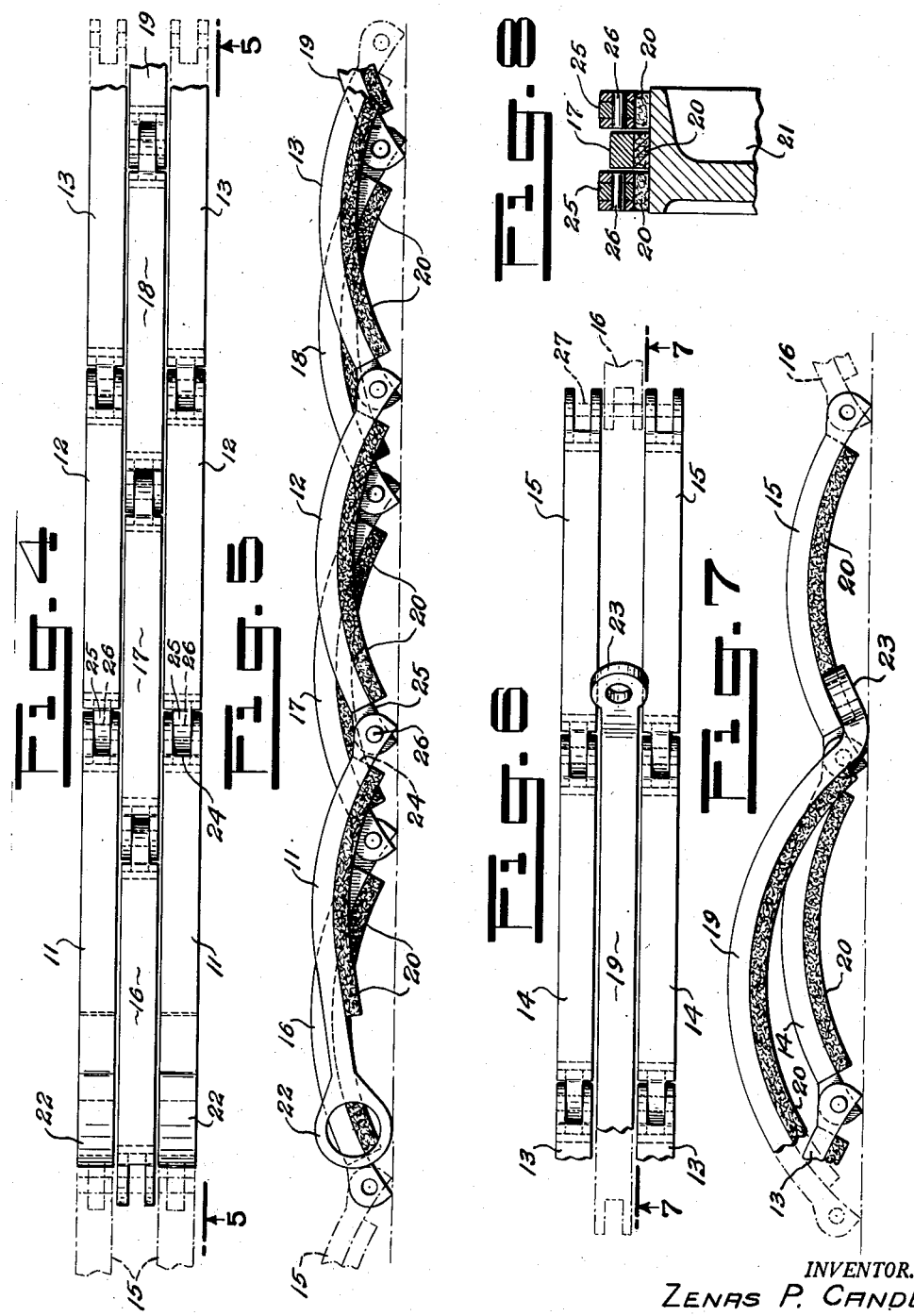

Patented Sept. 28, 1954

2,690,239

UNITED STATES PATENT OFFICE 2,690,239

FRICTION BRAKE

Zenas P. Candee, Watertown, Conn., assignor to The Waterbury Farrel Foundry & Machine Company, Inc., Waterbury, Conn., a corporation of Connecticut Application January 8, 1951, Serial No. 204,992

4 Claims. (Cl. 188—77)

This invention relates to friction brakes, and is directed particularly to improved friction brakes for use in connection with power punch presses or other machinery subject to hard and continuous duty.

In power punch presses wherein the punch stroke mechanism must be stopped frequently, at a predetermined position, it is desirable to employ a friction brake which not only is capable of dissipating large amounts of energy in a very short time, but also which is efficient and dependable over long periods of intermittent use.

One object of this invention is to provide a friction brake of the above nature which comprises a series of articulated arcuate brake shoe members which are arranged to embrace the outer cylindrical surface of a brake drum throughout an arc length greater than 360 degrees.

A further object of this invention is to provide a brake of the above character wherein the shoe mechanism is in the form of a double loop and acts upon the brake drum through an angle of over 600 degrees, thereby being capable of stopping the brake drum during a very small portion of a revolution.

A further object is to provide a device of the above nature which will be relatively simple in construction, inexpensive to manufacture, easy to install and manipulate, compact, ornamental in appearance, and very efficient and durable in use.

With these and other objects in view, there has been illustrated on the accompanying drawings one form in which the invention may conveniently be embodied in practice.

In the drawings,

Fig. 1 is a partial front view of a power punch press incorporating the improved brake mechanism therein.

Fig. 2 is an enlarged cross-sectional view taken along the line 2—2 of Fig. 1, showing in side elevation the improved brake embracing the outer periphery of the power press brake drum and the mechanism for controlling the braking action.

Fig. 3 is a partial view in elevation taken along the line 3—3 of Fig. 2, and shows the brake control mechanism.

Figs. 4 and 6 taken together, Fig. 6 being a continuation of Fig. 4, illustrate a top view of the articulated brake shoe members as they would appear when disassembled from the brake drum and laid out on a flat surface.

Fig. 5 is a view taken along the line 5—5 of Fig. 4, looking in the direction of the arrows, showing the brake shoe members in side elevation.

Fig. 7 is a sectional view taken along the line 7—7 of Fig. 6 looking in the direction of the arrows, showing the brake shoe members in side elevation.

Fig. 8 is a cross-sectional view taken along the line 8—8 of Fig. 2, looking in the direction of the arrows, and showing how the contiguous ends of the adjacent brake shoe members are joined by transverse dowel pins.

The present invention is an improvement over the invention disclosed in applicant's patent application entitled "Positive Jaw Clutch for Power Presses," Serial No. 757,227, filed June 26, 1947, patented July 10, 1951, No. 2,559,709, and only so much of the construction of said press is shown herein as is believed necessary to fully disclose the construction and operation of the improved friction brake.

Referring now to the drawings, in which like reference numerals denote corresponding parts throughout the several views, the numeral 10 indicates generally the improved friction brake assembly as it appears when incorporated in a power press P. The brake comprises a plurality of articulated arcuate shoe members of which there are a series of pairs of outer shoe members 11, 12, 13, 14, and 15, and, commencing from the ends of outer members 15, a series of inner shoe members 16, 17, 18 and 19 respectively (see Figs. 4, 5, 6 and 7).

Each of the shoe members 11 through 19 has fixed to its undersurface (as by cement or rivets) a layer of brake lining material 20.

Referring to Fig. 2, it will be seen how the lined shoe members, commencing with pair 11 and continuing counterclockwise, embrace the outer cylindrical surface of the power press brake drum 21 throughout nearly two revolutions.

The outer end of each of the shoe members 11 is provided with an enlarged integrally formed eye loop 22 having apertures extending transversely of the shoe member. At the other end of the chain of shoe members, the member 19 is provided with an integrally formed and outwardly-extending eye loop 23 having its aperture extending longitudinally of the brake members.

Each of the intermediate joints interconnecting the contiguous shoe members 11—19 inclusive comprises a torque and groove hinge connection. As will be seen by referring to Figs. 4, 5, and 8, for example, the inner end of shoe member 11 is longitudinally slotted as at 24 to receive therein a longitudinally extending reduced tongue 25 of the shoe member 12, the two shoe members 11 and 12 being swingably interconnected by a transverse cylindrical pin 26.

Referring to Fig. 6 it will be seen that the end of the single shoe member 16, between the ends of the pair of shoe members 15, is swingably joined to said members 15 by a single pin 27 passing transversely through all three members.

In order to control this improved friction brake, provision is made of a trip slide 28 (Figs. 2 and 3). Provision is also made of a link 29, one end of which is embraced by the eye loops 22 and interconnected thereto by a transverse pin 30. The other end of the link 29 is connected by a transverse pin 32 to one end of a control lever 31 which at its other end is pivotally connected by a pin 33 to the trip slide 28.

Provision is also made of a U-shaped control member 34 having apertured arms embracing the outer sides of the link 29 and the control lever 31, and the outer ends of the pin 32. The head of an adjustment bolt 35 is held within and against the bottom of the U-shaped member 34, said bolt 35 extending therethrough and through the aligned eye loop 23 of shoe member 19.

Surrounding the bolt 35 and between U-shaped member 34 and the eye loop 23 there is disposed a compression coil spring 36. The bolt assembly is held together by an internally threaded tubular adjustable member 37 screwed on the bolt 35 and against the outer side of eye loop 23. A wing nut 38 is also threaded on the bolt 35 to provide means for locking an adjustment member 37 in place.

*Operation*

Referring to Fig. 2, the power press brake drum rotates in a clockwise direction as indicated by the arrow. The brake mechanism is illustrated as being in "braking" or "on" position.

It will readily be evident that whereas in the ordinary power press friction brake of the type comprising an integral brake band surrounding the brake drum, the action depends entirely upon the force of the spring means or other means controlling the end of the brake band, in the present invention, the braking action is cumulative, the braking action commencing with a comparatively light actuating force to tighten the end of the articulated brake band and thereafter utilizing the inertia of the power press flywheel to tighten the brake, whereby positive braking is accomplished in a comparatively short time.

When the trip slide is moved downwardly for releasing the power press clutch, the link 29, the control lever 31, and the U-shaped control member 34 will assume the new position indicated in dashed lines. The inward movement of the U-shaped control member 34 will push the inner brake shoe member 19 counter-clockwise, thereby releasing the pressure of all the interconnected brake shoe members (10-19) against the brake drum, and allowing it to turn freely.

Adjustment of the brake may be readily accomplished by turning the tubular adjustment member 37 in or out along the adjustment bolt 35, after which wing nut 38 may be tightened against the outer end of the same to hold it securely in the desired position of adjustment.

One important advantage of the improved friction brake herein disclosed is that it engages the brake drum throughout nearly 720 degrees of the circumference thereof thereby greatly increasing the speed with which the braking may be accomplished.

Another advantage resides in the fact that the individual articulated brake shoe members, are of rigid construction and may be made heavier than the ordinary brake band shoes, thereby rendering them capable of absorbing more heat energy without danger of overheating.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a friction brake mechanism, a pair of outer parallel spaced-apart rows of pivotally connected, arcuate shoe members, said rows of shoe members being linked together in aligned pairs and in chain formation, an inner row of pivotally connected arcuate shoe members linked together in chain formation, and staggered with respect to the shoe members located within said outer rows, all of said shoe members having inner brake linings in their concave surfaces for frictionally engaging a brake drum, one of the joints between said inner shoe members being aligned with a common pivot pin which passes through the ends of an aligned pair of outer shoe members, said parallel rows of connected shoe members extending more than 360 degrees around the circumference of said drum, the action of said brake mechanism being cumulative due to inertia, and permitting the brake to be tightened with a relatively small force in a short period of rotation of the drum.

2. The invention as defined in claim 1, in which means is provided for inwardly drawing the extreme end shoe members of said rows toward each other to cause all of said shoe members to exert braking pressure on said drum.

3. The invention as defined in claim 1, in which a toggle mechanism is connected between the end shoe members of said inner row to tighten all of said rows of connected shoe members on said brake drum.

4. The invention as defined in claim 1, in which spring pressed screw and nut means are provided between the extreme shoe members of said inner row to adjust the pressure exerted upon said brake drum.

References Cited in the file of this patent

UNITED STATES PATENTS

| Number | Name | Date |
|---|---|---|
| 774,448 | Norris | Nov. 8, 1904 |
| 1,875,111 | Nieman | Aug. 30, 1932 |
| 2,164,300 | Smith | June 27, 1939 |
| 2,395,882 | Knox | Mar. 5, 1946 |
| 2,423,575 | Beezley | July 8, 1947 |

FOREIGN PATENTS

| Number | Country | Date |
|---|---|---|
| 102,767 | Germany | May 8, 1899 |
| 14,320 | Great Britain | July 27, 1895 |